US012647630B2

(12) United States Patent
Ramaswamy

(10) Patent No.: US 12,647,630 B2
(45) Date of Patent: Jun. 2, 2026

(54) METHODS AND SYSTEMS FOR SYNCHRONIZING STREAMING VIDEO SEGMENTS

(71) Applicant: Pluto Inc., West Hollywood, CA (US)

(72) Inventor: Srinath Venkatachalapathy Ramaswamy, New York, NY (US)

(73) Assignee: Pluto Inc., West Hollywood, CA (US)

( * ) Notice: Subject to any disclaimer, the term of this patent is extended or adjusted under 35 U.S.C. 154(b) by 212 days.

(21) Appl. No.: 18/757,276

(22) Filed: Jun. 27, 2024

(65) Prior Publication Data

US 2026/0006272 A1 Jan. 1, 2026

(51) Int. Cl.
*H04N 21/242* (2011.01)
*H04N 21/2343* (2011.01)
*H04N 21/488* (2011.01)

(52) U.S. Cl.
CPC ... *H04N 21/242* (2013.01); *H04N 21/234309* (2013.01); *H04N 21/4884* (2013.01)

(58) Field of Classification Search
None
See application file for complete search history.

(56) References Cited

U.S. PATENT DOCUMENTS

| | | | | |
|---|---|---|---|---|
| 7,770,199 B2 * | 8/2010 | Slater | ................. | H04N 21/2312 725/94 |
| 8,913,874 B2 * | 12/2014 | Manabe | ............. | H04N 21/4884 386/239 |
| 9,467,708 B2 * | 10/2016 | Soroushian | ...... | H04N 21/23439 |
| 9,621,613 B1 * | 4/2017 | Huang | .................... | H04L 67/02 |
| 10,652,625 B1 * | 5/2020 | Saxton | ............... | H04N 21/8547 |
| 11,825,175 B2 * | 11/2023 | Dhruv | ............. | H04N 21/26603 |
| 2003/0182620 A1 * | 9/2003 | Errico | .................... | H04N 21/84 715/202 |
| 2005/0008347 A1 * | 1/2005 | Jung | ................. | H04N 21/4325 386/230 |
| 2008/0207182 A1 | 8/2008 | Maharajh et al. | | |
| 2014/0140681 A1 * | 5/2014 | Lee | .................... | H04N 21/8455 386/241 |
| 2014/0351455 A1 * | 11/2014 | McCormick | .......... | H04N 21/83 709/248 |

(Continued)

FOREIGN PATENT DOCUMENTS

WO       WO2017080168 A1       5/2017

*Primary Examiner* — Mushfikh I Alam
(74) *Attorney, Agent, or Firm* — Knobbe, Martens, Olson & Bear LLP

(57) ABSTRACT

An aspect of the disclosure is related to methods and systems configured to detect and correct misalignments of segments in corresponding renditions of video content. A video is transcoded to generate renditions at respective different bit rates and/or resolutions, wherein a given rendition comprises a plurality of segments, the segments comprising a plurality of frames. First closed caption text is accessed for a first frame of a first segment of a first rendition. Second closed caption text for a first frame of a first segment of a second rendition is accessed. A determination is made as to whether the first closed caption text matches the second closed caption text. If they fail to match, the first segment of the second rendition is re-rendered. The re-rendered first segment of the second rendition is streamed over a network to a client device.

21 Claims, 6 Drawing Sheets

(56) References Cited

U.S. PATENT DOCUMENTS

| 2016/0066055 A1* | 3/2016 | Nir ..................... H04N 21/4755 |
| | | 725/35 |
| 2016/0234570 A1* | 8/2016 | Van Deventer .... H04N 21/4622 |
| 2018/0014025 A1* | 1/2018 | Syed ................... H04N 19/103 |
| 2019/0069038 A1 | 2/2019 | Phillips |
| 2020/0344282 A1 | 10/2020 | MacInnis |
| 2022/0038789 A1* | 2/2022 | Giladi ..................... H04L 65/65 |
| 2022/0360559 A1 | 11/2022 | Strein et al. |
| 2023/0028897 A1* | 1/2023 | Mukhopadhyay .... G06F 40/279 |
| 2024/0137591 A1* | 4/2024 | Lintz ................. H04N 21/2393 |
| 2025/0227320 A1* | 7/2025 | Stone ................ H04N 21/8547 |

* cited by examiner

104

106₁

102
NETWORK

106ₙ

108₁

108ₙ

*104*

*202A*

PROCESSING UNIT

*204A*

NETWORK INTERFACE

*206A*

COMPUTER-READABLE MEDIUM DRIVE

*208A*

INPUT/OUTPUT DEVICE INTERFACE

*210A*

MEMORY                                      *212A*

INTERFACE MODULE

*214A*

OPERATING SYSTEM

*216A*

MODULES AND SERVICES

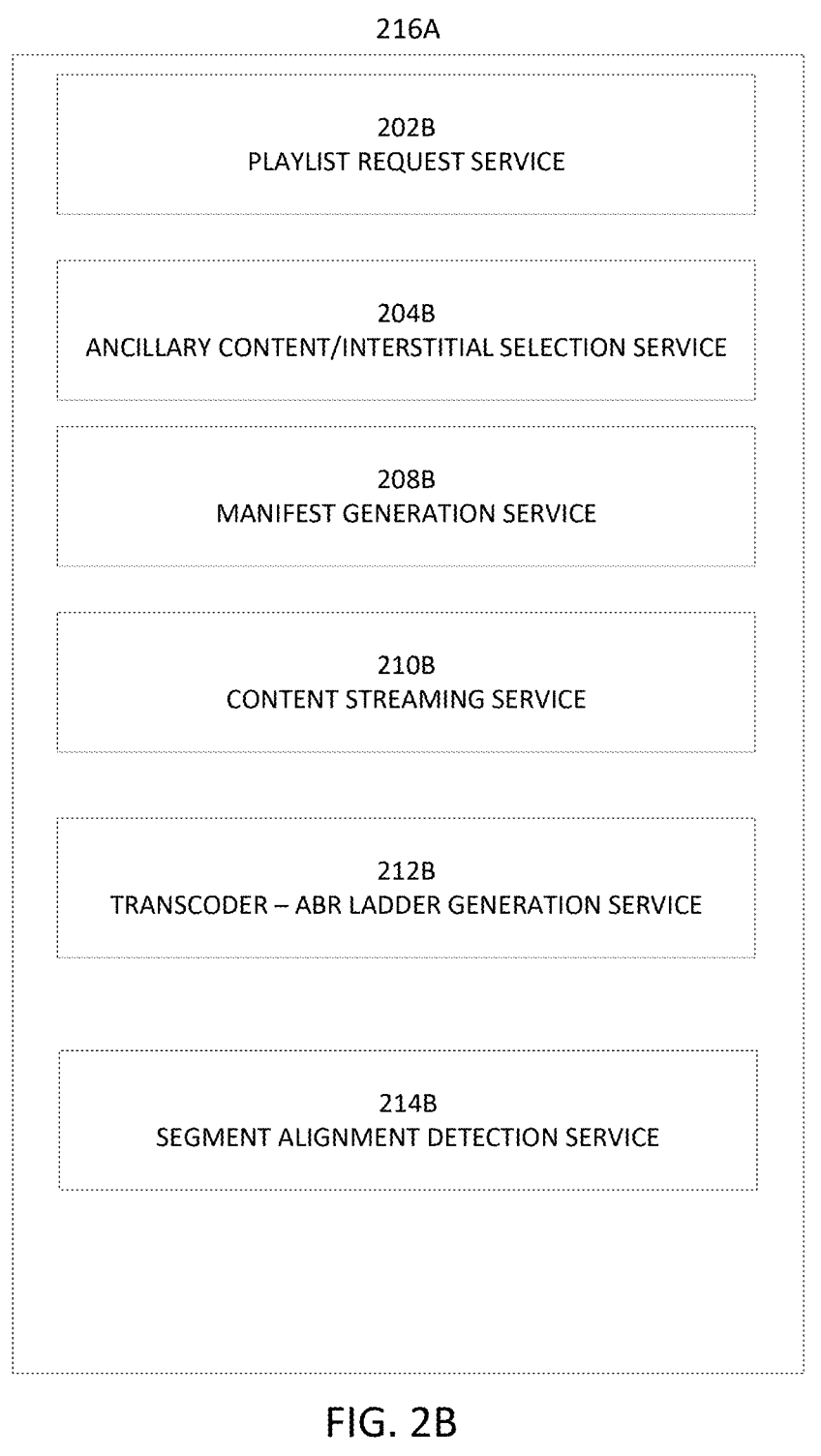

216A

202B
PLAYLIST REQUEST SERVICE

204B
ANCILLARY CONTENT/INTERSTITIAL SELECTION SERVICE

208B
MANIFEST GENERATION SERVICE

210B
CONTENT STREAMING SERVICE

212B
TRANSCODER – ABR LADDER GENERATION SERVICE

214B
SEGMENT ALIGNMENT DETECTION SERVICE

FIG. 2B

ABR LADDER BEFORE PARTIAL TRANSCODE

ABR LADDER AFTER PARTIAL TRANSCODE

METHODS AND SYSTEMS FOR SYNCHRONIZING STREAMING VIDEO SEGMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure is related to video streaming over a network and to the enhancement of such video streaming.

Description of the Related Art

In "over-the-top" (OTT) streaming (wherein content is streaming to Internet-connected devices) or in streaming video services such as FAST (free, ad-supported television), the incoming mezzanine stream is transcoded to several renditions. In particular, a mezzanine stream serves as a master file from which various other versions of the video can be derived, including the different bitrates and resolutions used in an ABR (Adaptive Bitrate) ladder for streaming. Thus, these several renditions at various resolutions and bitrates make up the ABR ladder available to the player. The player, based on the network condition and capabilities, selects the appropriate rendition from the ABR ladder for playback.

However, the ABR ladders may go through updates due to changes in video encoders, display requirements (e.g., 4K, 8K, etc.), customer requirements, and the like. Such ABR ladder updates may involve transcoding only the contribution content to the rendition that is being added or changed in the ABR ladder without transcoding the remaining renditions in the ladder, which may be referred to as Partial Transcode. Partial Transcoding may be used to optimize processing and storage efficiency, particularly in scenarios where only certain segments of a video need to be available in different formats or resolutions.

During transcoding the rendition is split into segments (smaller sub-clips, such as sub-clips of 5 seconds duration) to allow the player to quickly switch from one rendition to another in response to network bandwidth changes and to avoid playback issues.

However, such switching of rendition may disadvantageously result in the misalignment of frames between segments of renditions, resulting in a poor playback and viewing experience.

BRIEF DESCRIPTION OF THE DRAWINGS

FIG. 2B illustrates example modules and services.

DETAILED DESCRIPTION

Figure 1:
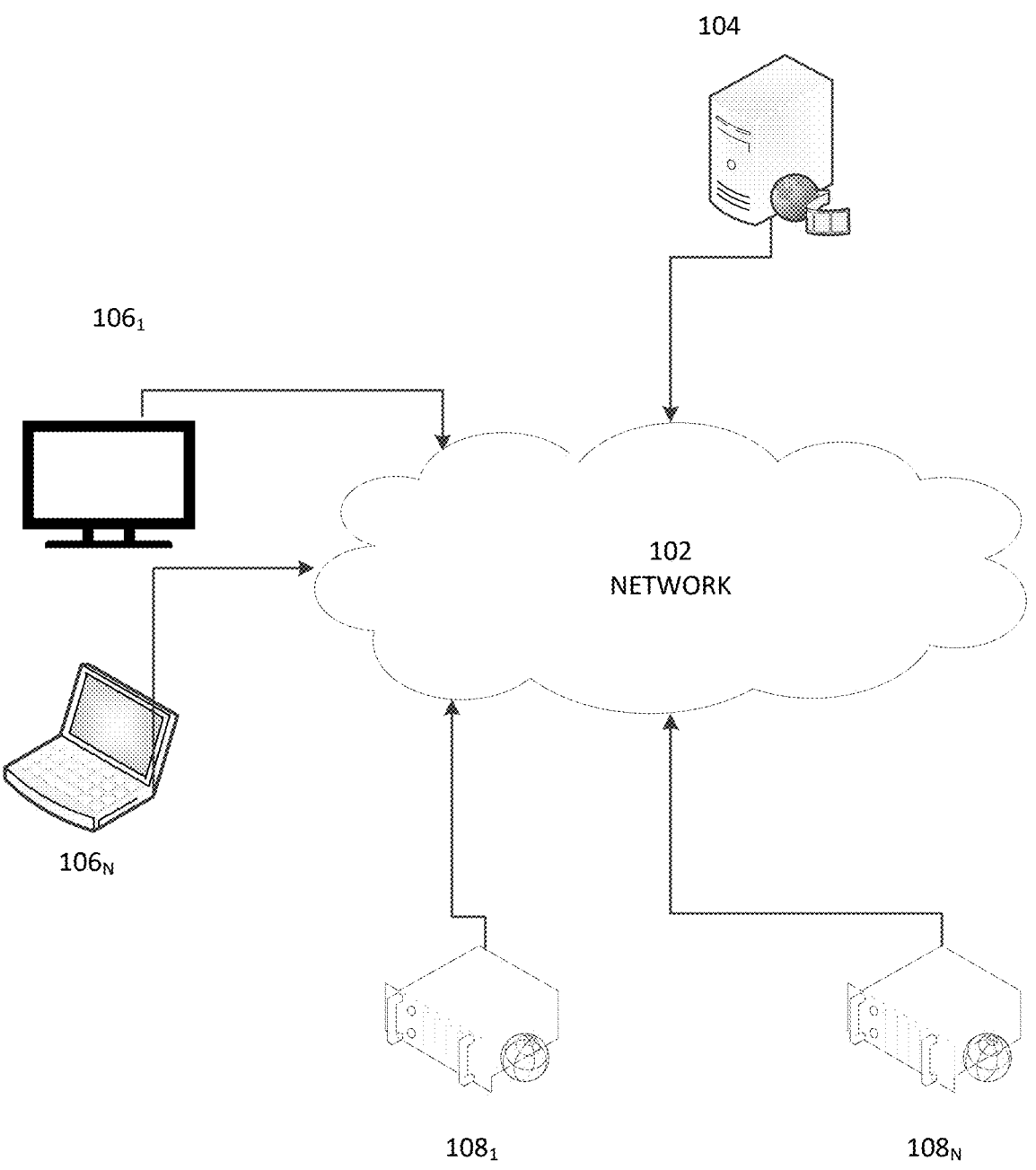
FIG. 1 illustrates an example environment.

An aspect of the present disclosure relates to methods and systems configured to ensure alignment of segments when switching between renditions at various resolutions and bitrates that make up an ABR (Adaptive Bitrate) ladder, to thereby overcome the technical problems introduced by conventional rendition switching.

As similarly discussed elsewhere herein, in "over-the-top" (OTT) streaming (wherein content is streaming to Internet-connected devices) or streaming video services such as FAST (free, ad-supported television) the incoming mezzanine stream is transcoded to several renditions. In particular, a mezzanine stream serves as a master file from which various other versions of the video can be derived, including the different bitrates and resolutions used in an ABR (Adaptive Bitrate) ladder for streaming. Thus, these several renditions at various resolutions and bitrates make up the ABR ladder available to the player.

The player, based on the network condition and capabilities, selects the appropriate rendition from the ABR ladder for playback.

For example, an ABR ladder provides a series of different bitrate and resolution levels used in adaptive streaming technologies, such as HTTP Live Streaming (HLS) or Dynamic Adaptive Streaming over HTTP (DASH). The ABR ladder enables the streaming service or client device to adjust the quality of the video stream in real-time based on the user's network conditions and device capabilities.

As discussed above, the ABR Ladder may provide different bitrates at which the video can be streamed. Higher bitrates typically provide better video quality but require more bandwidth. Different video resolutions corresponding to the bitrates may be provided. Higher resolutions provide clearer images but also need higher bitrates to maintain quality.

Thus, the ABR ladder enables a client device to receive the best possible quality video (e.g., without buffering) at a given point in time by dynamically adjusting the bitrate and resolution based on current network conditions. The ABR Ladder may make efficient use of available bandwidth by providing lower bitrate streams when the network is congested, and higher bitrate streams when bandwidth is plentiful.

In addition, the ABR ladder ensures compatibility with various devices and screen sizes by providing multiple resolution options.

The following indicates example combinations of bitrates and resolutions that may be provided via an ABR ladder:

| Bitrate (kbps) | Resolution | Frame Rate (fps) |
| --- | --- | --- |
| 300 | 240 p | 30 |
| 700 | 360 p | 30 |
| 1500 | 480 p | 30 |
| 3000 | 720 p | 30 |
| 5000 | 1080 p | 30 |
| 8000 | 1440 p | 30 |
| 12000 | 2160 p | 30 |

ABR operation will now be discussed in greater detail. A video is divided into small segments (e.g., 2-10 seconds long) encoded at different bitrates and resolutions. A manifest file (e.g., .m3u8 for HLS, .mpd for DASH) lists the available streams and their respective bitrates, resolutions, and segment URLs. The video player begins playback by choosing an appropriate stream based on the initial network conditions. During playback, the player continuously monitors the network conditions. If the player detects a change in network conditions (e.g., bandwidth drops or improves), it switches to a lower or higher bitrate stream accordingly. This switch typically happens at segment boundaries to minimize disruptions.

As discussed above, an ABR (Adaptive Bitrate) ladder may be updated for several reasons, often to improve the streaming experience for users and optimize the delivery of video content. For example, as similarly discussed elsewhere herein, the ABR ladders may go through updates due to changes in video encoders, display requirements (e.g., 4K, 8K, etc.), customer requirements, and the like.

For example, the ABR ladder may be updated to provide higher resolution and bitrate streams (e.g., adding 1440p or 2160p streams). By way of further example, advances in video codecs (e.g., H.265/HEVC, AV1) may allow for better compression, thereby providing higher quality at the same or lower bitrates. Thus, existing streams may be replaced or supplemented with streams encoded using newer, more efficient codecs. By way of still additional example, bit rates may be adjusted to better match typical user network conditions or to optimize CDN costs. By way of further example, streams may be adjusted to ensure compatibility with new devices (e.g., adding streams optimized for mobile devices or 4K TVs).

Such ABR ladder updates may involve transcoding only the contribution content to the rendition that is being added or changed in the ABR ladder without transcoding the remaining renditions in the ladder, which may be referred to as Partial Transcode. Such Partial Transcode enables the client player to quickly switch from one rendition to another in response to network bandwidth changes and to avoid playback issues. This necessitates alignment of the segments from the various renditions.

Figure 3A:
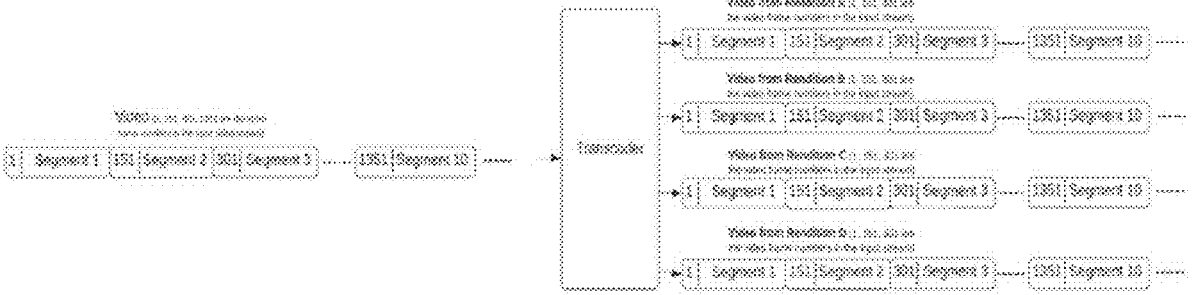
FIGS. 3A-3B illustrate example transcoding of video content.
Figure 3B:
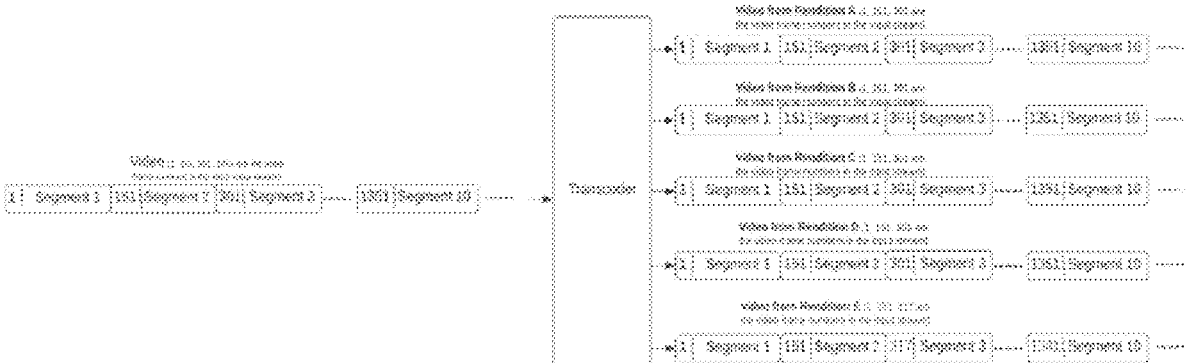

For example, the 10th segment in rendition A, B, C, D in the ABR ladder will start with a first frame that is from the same video frame in the contribution content. During a partial transcode where, for example, a new rendition E is added to this ABR ladder, the first frame from the 10th segment of rendition E may not be the same as that in 10th segments of rendition A, B, C and D. When this occurs, and when the client player switches from rendition D to rendition E at the 10th segment, the playback would start with the wrong frame, as illustrated in FIG. 3B, resulting in a poor, and inaccurate playback experience.

By way of background, each segment is typically assigned a sequential number. For example, in HTTP Live Streaming (HLS), the segments are numbered sequentially (e.g., segment0.ts, segment1.ts, etc.). Certain protocols may use timestamps to identify segments. For example, MPEG-DASH (Dynamic Adaptive Streaming over HTTP) uses media presentation timestamps (MPT) for segment identification. In addition, the URLs used to fetch the segments may contain identifiers that indicate the segment number or timestamp.

Further, a given frame within a video segment may be identified by its frame number, starting from 0 for the first frame in a segment. Frames may also be identified by their presentation timestamps (PTS). The PTS indicates the exact time at which the frame should be displayed during playback.

Segment misalignment will now be discussed with reference to FIGS. 3A and 3B. FIG. 3A illustrates an example ABR Ladder before Partial Transcode while FIG. 3B illustrates the ABR ladder after Partial Transcode. As illustrated in FIG. 3A, an input video stream comprising Segment 1 (beginning at frame 1), Segment 2 (beginning at frame 151), Segment 3 (beginning at frame 301), through Segment 10 (beginning at frame 1351) are fed into a transcoder to generate Rendition A, Rendition B, Rendition C, and Rendition D (where different renditions may have different bit rates and/or resolutions). Each of the renditions are synchronized, wherein respective segments of each rendition start with the same frame number and refer to the same video frame as in the input contribution feed, and wherein the rendition segments begin with the same frame as in the input video frame.

FIG. 3B illustrates the same input video stream as FIG. 3A, but with a Partial Transcode performed. In this example, the first frame in Segment 3 from Video Rendition E that is added to the ABR ladder after a partial transcode refers to frame 317 in the input video, rather than the frame 301 referred to by Rendition A, Rendition B, Rendition C, and Rendition D. Further, as illustrated in FIG. 3B, in rendition E the first frame of segment 10 incorrectly refers to frame 1341 in the input video rather than frame 1351 as in the other renditions. When the client player switches from Rendition A or B or C or D to rendition E during Segment 3 or Segment 10, the previous content shown may be repeated or content may be skipped, thereby providing an inaccurate playback and resulting in a poor viewer experience.

Technical solutions that overcome some or all of the technical problems and challenges described herein will now be described with reference to the figures. As described herein, closed captions may be utilized to ensure segments are properly aligned form segment switching (e.g., where a given rendition may be the result of Partial Transcoding).

Typically, closed captions may be included in video content streamed online and broadcast over the air, via cable, or via satellite. For example, closed captions may be embedded in the video stream. Optionally, CEA-608 (SD) and CEA-708 (HD) standards may be used for closed captioning in streamed content and in North American broadcasts. Respective closed captioning text (e.g., in the CEA-608/CEA-708 closed captions format) may be included in respective video frames as user data.

In particular, closed captioning, optionally formatted in accordance with CEA-608 or CEA-708, may optionally be provided via Supplemental Enhancement Information (SEI) messages. SEI messages are part of the H.264/AVC and H.265/HEVC video compression standards. SEI messages enable the inclusion of additional data that is not directly related to the video content but can be used to enhance the viewing experience. SEI messages can carry a variety of data types, including closed captions.

For example, closed caption data text (e.g., in the CEA-608/CEA-708 closed captions format) may be encoded within SEI messages. The SEI message containing the caption data may be inserted into the video stream, wherein the SEI messages are inserted into the video stream at appropriate intervals, synchronized with the video frames.

Examples of how different streaming protocols handle SEI messages are as follows:

HLS (HTTP Live Streaming): HLS may carry SEI messages within the video segments. The SEI messages are interpreted by the client-side player to extract and display the closed captions.

DASH (Dynamic Adaptive Streaming over HTTP): Similar to HLS, DASH includes SEI messages in the video segments referenced in the DASH manifest (MPD) file.

MPEG-TS (MPEG Transport Stream): MPEG-TS may carry SEI messages along with the video and audio streams.

Advantageously, captions are tightly synchronized with the video frames since they are embedded directly in the video stream and there is no need for separate caption files, reducing the number of HTTP requests and potentially improving streaming efficiency.

The client-side player (e.g., a web browser, mobile app, connected television application, or set-top box) on a user device extracts SEI messages from the video stream during playback and performs SEI message decoding to extract and display the closed captions. The extracted caption data is rendered on the user device display, synchronized with the video (e.g., the video frames). This optionally comprises converting the SEI message data (e.g., CEA-608/708 captions) into a displayable format. As discussed herein, the closed captions may also be utilized to perform segment alignment.

In order to overcome the technical problem of misalignment in cases where partial transcoding is performed, embedded closed captioning (e.g., CEA-608/708 formatted captions) may be used to detect and correct such misalignments.

For example in a video stream, the following closed caption (CC) text may be provided at the various frames in a segment (such as Segment E in FIG. 3B).

Video Frame 151 CC: "IT WAS"
Video Frame 152 CC: "IT WAS SPECIFICALLY"
Video Frame 153 CC: "IT WAS SPECIFICALLY"
Video Frame 154 CC: "IT WAS SPECIFICALLY AND"

The disclosed systems and processes may be configured to detect misalignment during or after a partial transcode as follows.

The closed caption is extracted from each video frame (or a subset of video frames) in a segment from the newly transcoded rendition (a rendition that was subject to Partial Transcoding). For example, with reference to FIG. 3B, the closed caption may be extracted (e.g., from SEI messages) from each video frame in Rendition E, Segment 2, where Rendition E may be newly generated using partial transcoding by the transcoder after Renditions A, B, C, D. Closed caption data may be similarly extracted from each video frame (or a subset of video frames) in the corresponding segment that is supposed to be aligned to the foregoing segment from the new rendition. For example, referring again to FIG. 3B, the closed caption may be extracted from each video frame in Rendition B, Segment 2 (where ideally the beginning and end frames of Rendition E, Segment 2 should have the same first and last frames as Rendition B, Segment 2).

A closed caption from a randomly selected video frame from the segment from the newly transcoded rendition may be extracted (e.g., from a corresponding SEI message). Such random selection may provide a higher percentage chance that a misalignment will be detected as compared to always examining the same frame. However, optionally the frame is not randomly selected. In this example, the closed caption from a frame (e.g., frame 10) randomly selected from Rendition E, Segment 2 may be extracted.

The closed caption extracted from the randomly selected video frame from the segment from the newly transcoded rendition may be compared with the closed caption from the corresponding frame in the previously transcoded segment. In this example, the closed caption from the randomly selected frame selected from Rendition E, Segment 2 may be compared to the closed caption from the corresponding frame (having the same frame position) from Rendition B, Segment 2.

An alignment determination may then be made using the closed caption from the randomly selected video frame from the segment from the newly transcoded rendition and the closed caption from the corresponding frame in the previously transcoded segment.

For example, referring again to FIG. 3B, frame 10, Segment 2, from Rendition E may have a closed caption of "THIS IS A GARDEN" whereas the corresponding frame 10, Segment 2, from Rendition B may have a closed caption "THIS IS A". The closed captions may be compared to determine if they match. If the video frames are aligned then the closed captions from respective frames 10 will match. For example, for the frames to be aligned in this example, frame 10, Segment 2, from Rendition E would need to have a closed caption of "THIS IS A", however since it does not, and instead has the closed caption of "THIS IS A GARDEN," Segments E and B are not aligned.

Optionally, if a segment misalignment is detected, then the new, misaligned segment may be rebuilt (re-transcoded) so that it is aligned with the other segment(s). The rebuilt segment of Rendition E may again be analyzed as described above to ensure it is synchronized with Rendition B. This process of segment rebuilding and alignment analysis may be repeatedly performed until the segments are aligned.

Certain additional aspects will now be described with reference to the figures.

FIG. 1 illustrates an example environment. A content composer system 104 (which may include a stitcher component, such as a server, providing stitcher services or where a stitcher system may include a content composer component, or where the content composer and the stitcher may be independent systems) is connected to a network 102. The content composer system 104 is configured to communicate with client devices $106_1 \ldots 106_n$ (e.g., associated with users of a streaming service) that comprise video players. By way of example, the video player may be embedded in a webpage, may be a dedicated video player application, or may be part of a larger app (e.g., a game application, a word processing application, etc.). The video player may be configured to play video and/or audio content, including primary content and ancillary content. For example, the content composer system 104 may receive a request for media from a given client device 106 in the form of a request for a playlist manifest or updates to a playlist manifest.

The content composer system 104 may identify, from a file, the location and length of an ancillary content pod, such as an interstitial pod (a time frame reserved for ancillary content, such as interstitials, wherein one or more interstitials may be needed to fill a pod, wherein an item of ancillary content may be in the form of interstitial content), determine context information (e.g., information regarding the primary content being requested, information regarding the user, and/or other context information), solicit and select interstitial content from third parties, define customized interstitials as described herein, generate playlist manifests, and/or perform other functions described herein. The content composer system 104 and/or another system may stream requested content to the requesting device 106.

Optionally, the content composer system 104 may transmit context information to one or more interstitial source systems 108₁ . . . 108ₙ. For example, the source systems 108₁ . . . 108ₙ may optionally include ad servers, and the interstitial content may comprise ads. The interstitial source systems 108₁ . . . 108ₙ may comply with the VAST protocol. By way of further example, the interstitial source systems 108₁ . . . 108ₙ may provide public service videos, previews of upcoming programs, quizzes, news, games, and/or other content. The interstitial source systems 108₁ . . . 108ₙ may use the context information in determining what interstitial content is to be provided or offered to the requesting client device 106. Optionally, as part of a decisioning process, the interstitial source systems 108₁ . . . 108ₙ may submit bids to place interstitial content in association with primary content, and the content composer system 104 may evaluate the bids and optionally based at least in part on the bids, select one or more items to insert into an interstitial pod. The interstitial source systems 108₁ . . . 108ₙ may be configured to receive signaling to reject the corresponding ad campaign and/or advertiser from the content composer system 104 indicating that a particular item of ancillary content, such as interstitial content, is not to be transmitted to client devices 106₁ . . . 106ₙ, as similarly discussed elsewhere herein. The content composer system 104 may be configured to transmit closed caption messages (e.g., SEI messages) for respective video frames.

As similarly described elsewhere herein, the content composer system 104 may be configured to transcode incoming video content and to generate an ABR ladder that comprises multiple renditions of the incoming video content at different resolutions and bitrates. The different renditions may comprise multiple segments, wherein each segment may include one or more frames. One or more segments may be transcoded using partial transcoding.

As further described herein, the content composer system 104 may be configured to detect misalignments of segments in different renditions and to correct such misalignments by re-transcoding/rebuilding the misaligned segments. Such correction reduces or eliminates misalignment artifacts, such the repeat or skipping of content (e.g., one or more frames of content), and therefore provides a more accurate playback and an enhanced viewer experience as compared to conventional streaming systems that utilize ABR ladders. The client player, based on the network condition and capabilities, may then select the appropriate rendition from the ABR ladder for playback, where the rendition segments are now aligned.

Figure 2A:
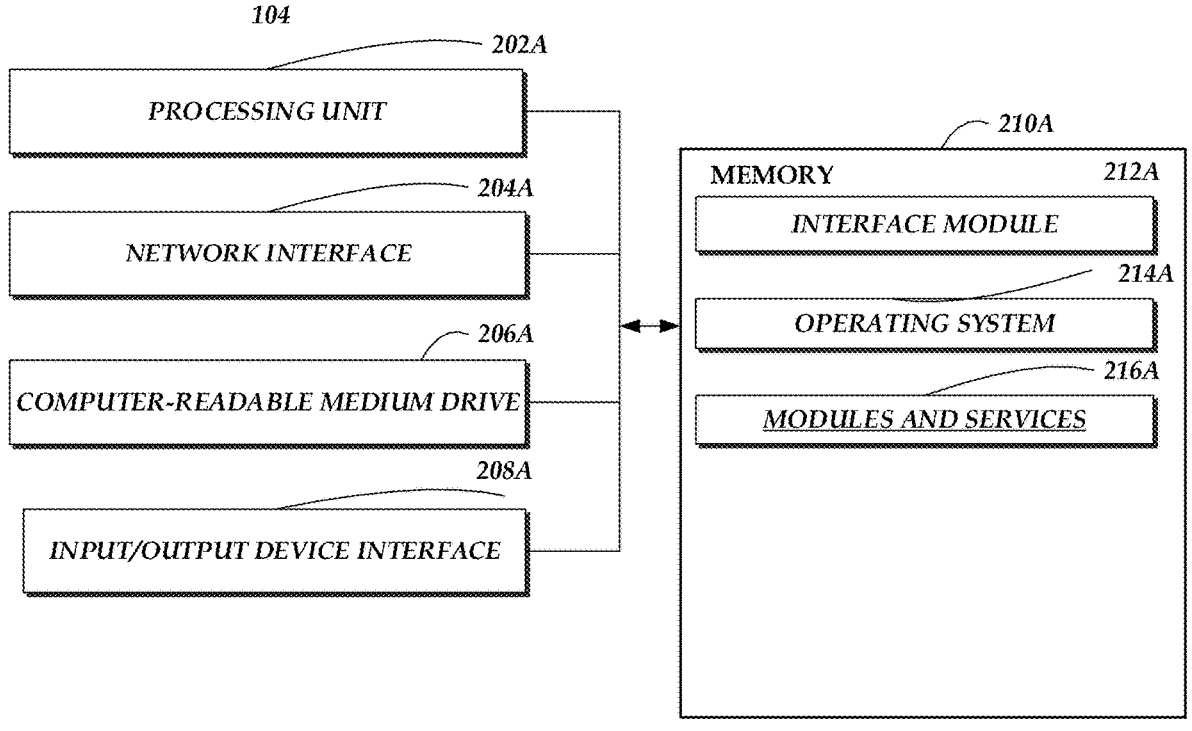
FIG. 2A is a block diagram illustrating example components.

FIG. 2A is a block diagram illustrating example components of a content composer system 104. The example content composer system 104 includes an arrangement of computer hardware and software components that may be used to implement aspects of the present disclosure. Those skilled in the art will appreciate that the example components may include more (or fewer) components than those depicted in FIG. 2A.

The content composer system 104 may include one or more processing units 202A (e.g., a general purpose processor or artificial intelligence processor (e.g., comprising one or more arithmetic logic units, data registers, an encryption processor, a video transcoder, input/output busses, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks or computing systems.

The processing unit 202A may thus receive information and instructions from other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more features of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include both a general purpose processor and a video codec. The system 104 may offload certain compute-intensive portions of the modules and services 216A (e.g., transcoding and/or transrating a stream for adaptive bitrate operations, compositing, and/or the like) to one or more dedicated devices, such as a standalone video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams).

The processing unit 202A may optionally comprise a graphics processing unit (GPU) that includes hundreds or thousands of core processors configured to process tasks in parallel. The GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring to FIG. 2B, the modules and services 216A may include modules that provide a playlist request service 202B, an interstitial selection service 204B, a playlist manifest generation service 208B, a content streaming service 210B, a transcoder-ABR ladder generation service 212B, and a segment alignment detection service 214B.

The playlist request service 202B may receive and process requests for playlist manifests, such as manifests discussed elsewhere herein. The interstitial selection service 204B may assemble context information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source and/or decisioning systems. The interstitial source and/or decisioning systems may propose interstitial content to the interstitial selection service 204B of the stitching system. The interstitial selection service 204B may evaluate the proposals and select one or more items of interstitial content for inclusion in the interstitial pod. The content streaming service 210B may be configured to stream video and other content, including closed captions, as similarly discussed elsewhere herein.

A transcoder-ABR ladder generation service 212B may be used to transcode incoming video streams and to generate ABR ladders.

Optionally, before actual transcoding, several pre-processing steps may be applied. For example, interlaced video may be deinterlaced into progressive scan format. Noise reduction may be performed to improve video quality. The video content may be resized to different resolutions.

The transcoder-ABR ladder generation service 212B may be configured with multiple encoding profiles. A given profile defines specific parameters such as resolution, bitrate, and frame rate. These profiles correspond to the different rungs of the ABR ladder. For a respective profile, the transcoder may perform some or all of the following.

The video may be resized to the resolution specified by the profile (e.g., 7680, 1080p, 720p, 480p, 360p). The video may be encoded at the specified bitrate. Efficient bitrate allocation ensures optimal quality at a given bitrate level. A codec (e.g., H.264/AVC, H.265/HEVC) is used for encoding. The video is encoded using the codec and selected profile settings.

For example, the encoding process may perform compression to reduce the file size by removing redundant information. Quantization may be performed, wherein certain video content is approximated to reduce complexity. Entropy coding may be performed to further compress the data using (e.g., using Huffman coding or the like).

Once the video is transcoded into different bitrate and/or resolution versions, it is segmented into small chunks (e.g., 2 to 10 seconds). These segments are used for adaptive streaming, enabling the player to switch between different quality levels of an item of streaming video content seamlessly as described elsewhere herein.

The manifest generation service 208B may be used to assemble a playlist manifest (e.g., M3U8 for HLS, MPD for DASH) including locators (e.g., URLs) pointing to segments and sections of primary and interstitial content and locators (e.g., URLs), organized to correspond to the desired playback sequence. The manifest file may list the available bitrate versions and their corresponding segments. The manifest file informs the player about the structure of the stream and how to access each segment. The manifest may be transmitted to a client (e.g., a browser or dedicated streaming application) on a user device. The client may then request a given item of content (e.g., section or segment) as needed, which may then be served by the corresponding content source or intermediary to the client.

The encoded video segments and manifest files are packaged and prepared for distribution. For example, the content may be encrypted and protected using a DRM (Digital Rights Management) system. The package content may be uploaded to and distributed via a Content Delivery Network (CDN) for efficient delivery to end-users.

During playback, the client-side player uses the manifest file to dynamically switch between different quality levels based on network conditions and device capabilities. This ensures a smooth viewing experience with minimal buffering.

As similarly discussed elsewhere herein, an ABR ladder typically includes several rungs with different resolutions and bitrates. A given rung is configured to provide a balance between quality and bandwidth usage, enabling adaptive streaming to deliver an optimized experience under varying network conditions.

Thus, the video transcoder is configured to efficiently create multiple versions of a video, enabling adaptive bitrate streaming and ensuring a high-quality viewing experience for users on different devices and network conditions.

Figure 4:
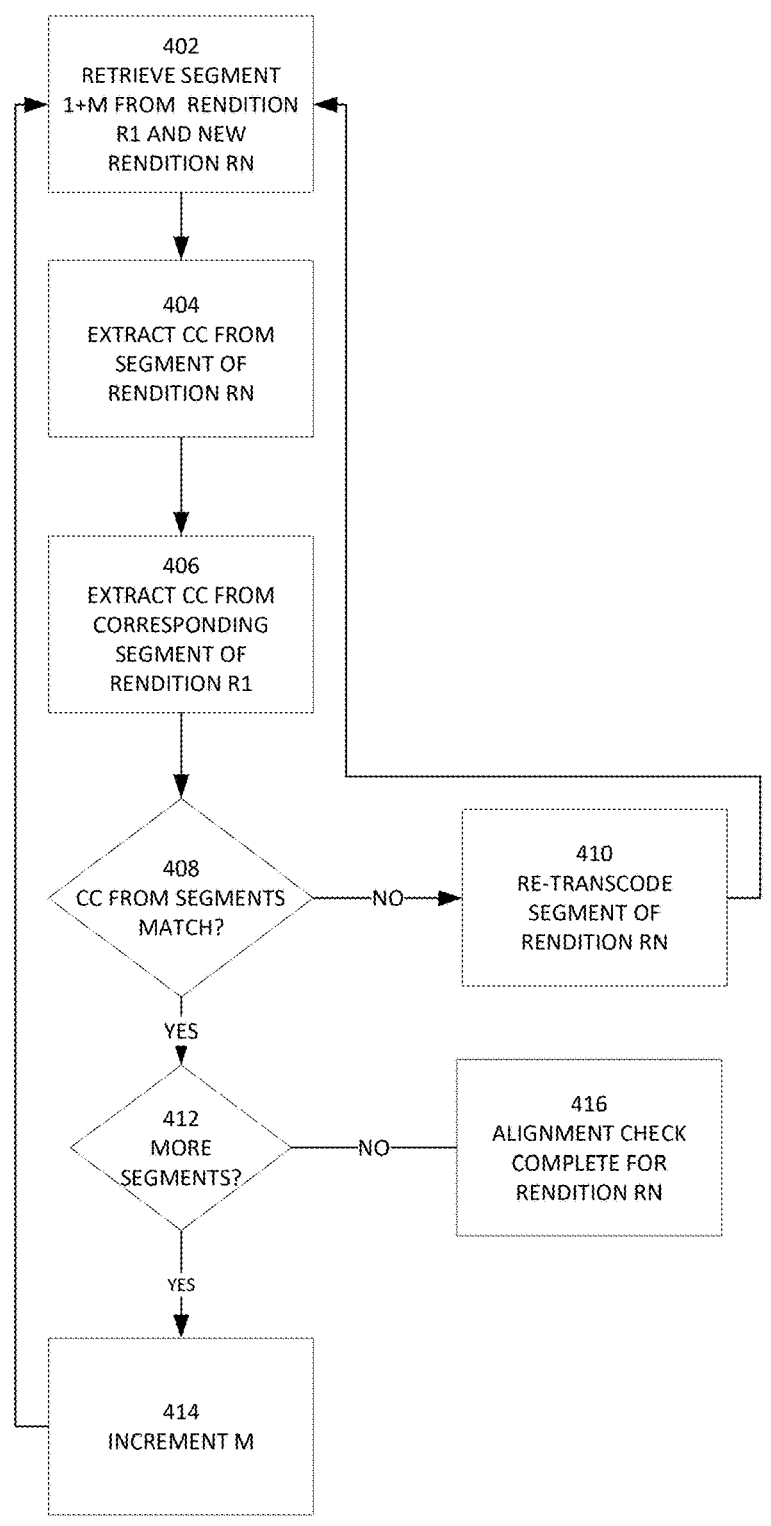
FIG. 4 illustrates an example process.
While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

A segment alignment detection service 214B is configured to detect proper alignment or misalignments between different renditions of an incoming video as similarly described elsewhere herein, and in particular, with reference to FIG. 4.

Referring to FIG. 4, an example process for determining segment alignment and correction of detected misalignments is illustrated. The process may be executed by the segment alignment detection service 214B of the content composer system 104.

At block 402, a segment (Segment 1+M, where M is initially set to zero) from a new rendition (Rendition $R_N$), which may be created using a partial transcode, and a corresponding segment (Segment 1+M) from a previously generated rendition (Rendition $R_1$ in this example, where $R_1$ may be any rendition, such as any previously transcoded rendition, other than Rendition $R_N$) are retrieved.

At block 404, the closed caption data is extracted (e.g., from respective SEI messages) from one or more frames of Segment 1+M of Rendition $R_N$.

At block 406, the closed caption data is extracted from one or more frames of Segment 1+M from Rendition $R_1$.

At block 408, a comparison is made between the closed caption for a frame in Segment 1+M from Rendition $R_N$ and the corresponding frame in Segment 1+M from Rendition $R_1$. The frame for which the comparison is made may be randomly selected or a particular frame may be selected (e.g., the middle frame, the last frame, or other frame). For example, an equality check may be performed to ensure that each character, optionally including punctuation, of the closed caption for a frame in Segment 1+M from Rendition $R_N$ and the corresponding frame in Segment 1+M from Rendition $R_1$ match.

If a determination is made that the closed captions from the frames respectively from Segment 1+M of Rendition $R_N$, and Segment 1+M of Rendition $R_1$ do not match (indicating that the segments are not aligned properly), the process may proceed to block 410, and Segment 1+M from Rendition $R_N$ may be re-transcoded, and the process of determining if Segment 1+M from Rendition $R_N$ is aligned with Segment 1+M from Rendition $R_1$ may be repeated using the re-transcoded version of Segment 1+M from Rendition $R_N$.

If a determination is made that the closed captions from the frames respectively from Segment 1+M of Rendition $R_N$, and Segment 1+M of Rendition $R_1$ do match (indicating that the segments are aligned properly), the process may proceed to block 412, and a determination may be made as to whether there are additional segments in Rendition $R_N$ that have not yet been analyzed to determine if they are properly aligned. If there are additional segments, the segment count variable "M" may be incremented (e.g., by 1), the process may proceed back to block 402, and the next segment may be accessed and inspected for proper alignment.

If a determination is made that all the segments of Rendition $R_N$ have been inspected, at block 416, an indication may be generated indicating that the alignment inspection for Rendition $R_N$ is complete. Optionally, additional renditions may be similarly inspected for proper alignment.

Thus, methods and systems are described configured to determine if renditions in an ABR ladder are properly aligned, and to rectify detected misalignments.

An aspect of the present disclosure relates to methods and systems configured to detect and correct misalignments of segments in corresponding renditions of video content. A video is transcoded to generate renditions at respective different bit rates and/or resolutions, wherein a given rendition comprises a plurality of segments, the segments comprising a plurality of frames. First closed caption text is accessed for a first frame of a first segment of a first rendition. Second closed caption text for a first frame of a first segment of a second rendition is accessed. A determination is made as to whether the first closed caption text matches the second closed caption text. If they fail to match, the first segment of the second rendition is re-rendered. The re-rendered first segment of the second rendition is streamed over a network to a client device.

An aspect of the present disclosure relates to a system, comprising: a computer device; non-transitory computer readable memory having program instructions stored thereon that when executed by the computer device cause the system to perform operations comprising: transcode a video to generate a plurality of renditions at respective different bit rates and/or resolutions, wherein a given rendition comprises a plurality of segments, the segments comprising a plurality of frames; access first closed caption text for a first frame of a first segment of a first rendition; access second closed caption text for a first frame of a first segment of a second rendition, wherein the first segment of the second rendition has a same segment position as the first segment of the first rendition, and wherein a position of the first frame of the first segment of the first rendition is a same position as the first frame of the first segment of the second rendition; determine whether the first closed caption text matches the second closed caption text; at least partly in response to determining that the first closed caption text fails to match the second closed caption text: cause the first segment of the second rendition to be re-rendered; and cause the re-rendered first segment of the second rendition to be streamed over a network to a client device; at least partly in response to determining that the first closed caption text fails to match the second closed caption text: cause the first segment of the second rendition to be streamed over the network to the client device.

Optionally, the first segment of the second rendition is partially transcoded. Optionally, the first frame is a randomly selected frame. Optionally, the plurality of renditions at respective different bit rates and/or resolutions are included in an ABR (Adaptive Bitrate) ladder. Optionally, the first closed caption text for the first frame of the first segment of the first rendition is accessed from a Supplemental Enhancement Information (SEI) message. Optionally, at least partly in response to determining that the first closed caption text fails to match the second closed caption text, the system causes a misalignment indication to be generated. Optionally, the system is configured to transmit a manifest file to the client device, the manifest file identifying available bitrate versions and their corresponding segments.

An aspect of the present disclosure relates to a computer implemented method, the method comprising: transcoding a video to generate a plurality of renditions at respective different bit rates and/or resolutions, wherein a given rendition comprises a plurality of segments, the segments comprising a plurality of frames; accessing first closed caption text for a first frame of a first segment of a first rendition; accessing second closed caption text for a first frame of a first segment of a second rendition, wherein the first segment of the second rendition has a same segment position as the first segment of the first rendition, and wherein a position of the first frame of the first segment of the first rendition is a same position as the first frame of the first segment of the second rendition; determining whether the first closed caption text matches the second closed caption text; at least partly in response to determining that the first closed caption text fails to match the second closed caption text: causing the first segment of the second rendition to be re-rendered; and causing the re-rendered first segment of the second rendition to be streamed over a network to a client device.

Optionally, the first segment of the second rendition is partially transcoded. Optionally, the first frame is a randomly selected frame. Optionally, the plurality of renditions at respective different bit rates and/or resolutions are included in an ABR (Adaptive Bitrate) ladder. Optionally, the first closed caption text for the first frame of the first segment of the first rendition is accessed from a Supplemental Enhancement Information (SEI) message. Optionally, at least partly in response to determining that the first closed caption text fails to match the second closed caption text, causing a misalignment indication to be generated. Optionally, the method further comprises transmitting a manifest file to the client device, the manifest file identifying available bitrate versions and their corresponding segments.

An aspect of the present disclosure relates to a non-transitory computer readable memory having program instructions stored thereon that when executed by a computing device cause the computing device to perform operations comprising: transcode a video to generate a plurality of renditions at respective different bit rates and/or resolutions, wherein a given rendition comprises a plurality of segments, the segments comprising a plurality of frames; access first closed caption text for a first frame of a first segment of a first rendition; access second closed caption text for a first frame of a first segment of a second rendition, wherein the first segment of the second rendition has a same segment position as the first segment of the first rendition, and wherein a position of the first frame of the first segment of the first rendition is a same position as the first frame of the first segment of the second rendition; determine whether the first closed caption text matches the second closed caption text; at least partly in response to determining that the first closed caption text fails to match the second closed caption text: cause the first segment of the second rendition to be re-rendered; and cause the re-rendered first segment of the second rendition to be streamed over a network to a client device; at least partly in response to determining that the first closed caption text fails to match the second closed caption text: cause the first segment of the second rendition to be streamed over the network to the client device.

Optionally, the first segment of the second rendition is partially transcoded. Optionally, the first frame is a randomly selected frame. Optionally, the plurality of renditions at respective different bit rates and/or resolutions are included in an ABR (Adaptive Bitrate) ladder. Optionally, the first closed caption text for the first frame of the first segment of the first rendition is accessed from a Supplemental Enhancement Information (SEI) message. Optionally, at least partly in response to determining that the first closed caption text fails to match the second closed caption text, the operations are configured to cause a misalignment indication to be generated. Optionally, the operations further comprise transmitting a manifest file to the client device, the manifest file identifying available bitrate versions and their corresponding segments.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
a computer device;
non-transitory computer readable memory having program instructions stored thereon that when executed by the computer device cause the system to perform operations comprising:
transcode a video to generate a plurality of renditions at respective different bit rates and/or resolutions, wherein a given rendition comprises a plurality of segments, the segments comprising a plurality of frames;
access first closed caption text for a first frame of a first segment of a first rendition;
access second closed caption text for a first frame of a first segment of a second rendition, wherein the first segment of the second rendition has a same segment position as the first segment of the first rendition, and wherein a position of the first frame of the first segment of the first rendition is a same position as the first frame of the first segment of the second rendition;
determine whether the first closed caption text matches the second closed caption text;
at least partly in response to determining that the first closed caption text fails to match the second closed caption text:
cause the first segment of the second rendition to be re-rendered; and
cause the re-rendered first segment of the second rendition to be streamed over a network to a client device; and
at least partly in response to determining that the first closed caption text fails to match the second closed caption text:
cause the first segment of the second rendition to be streamed over the network to the client device.

2. The system as defined in claim 1, wherein the first segment of the second rendition is partially transcoded.

3. The system as defined in claim 1, wherein the first frame is a randomly selected frame.

4. The system as defined in claim 1, wherein the plurality of renditions at respective different bit rates and/or resolutions are included in an ABR (Adaptive Bitrate) ladder.

5. The system as defined in claim 1, wherein the first closed caption text for the first frame of the first segment of the first rendition is accessed from a Supplemental Enhancement Information (SEI) message.

6. The system as defined in claim 1, wherein at least partly in response to determining that the first closed caption text fails to match the second closed caption text, the system is configured to cause a misalignment indication to be generated.

7. The system as defined in claim 1, wherein the system is configured to transmit a manifest file to the client device, the manifest file identifying available bitrate versions and their corresponding segments.

8. A computer implemented method, the method comprising:
transcoding a video to generate a plurality of renditions at respective different bit rates and/or resolutions, wherein a given rendition comprises a plurality of segments, the segments comprising a plurality of frames;
accessing first closed caption text for a first frame of a first segment of a first rendition;
accessing second closed caption text for a first frame of a first segment of a second rendition, wherein the first segment of the second rendition has a same segment position as the first segment of the first rendition, and wherein a position of the first frame of the first segment of the first rendition is a same position as the first frame of the first segment of the second rendition;
determining whether the first closed caption text matches the second closed caption text;
at least partly in response to determining that the first closed caption text fails to match the second closed caption text:
causing the first segment of the second rendition to be re-rendered; and
causing the re-rendered first segment of the second rendition to be streamed over a network to a client device.

9. The computer implemented method as defined in claim 8, wherein the first segment of the second rendition is partially transcoded.

10. The computer implemented method as defined in claim 8, wherein the first frame is a randomly selected frame.

11. The computer implemented method as defined in claim 8, wherein the plurality of renditions at respective different bit rates and/or resolutions are included in an ABR (Adaptive Bitrate) ladder.

12. The computer implemented method as defined in claim 8, wherein the first closed caption text for the first frame of the first segment of the first rendition is accessed from a Supplemental Enhancement Information (SEI) message.

13. The computer implemented method as defined in claim 8, the method further comprising: at least partly in response to determining that the first closed caption text fails to match the second closed caption text, causing a misalignment indication to be generated.

14. The computer implemented method as defined in claim 8, the method further comprising transmitting a manifest file to the client device, the manifest file identifying available bitrate versions and their corresponding segments.

15. Non-transitory computer readable memory having program instructions stored thereon that when executed by a computing device cause the computing device to perform operations comprising:
transcode a video to generate a plurality of renditions at respective different bit rates and/or resolutions, wherein a given rendition comprises a plurality of segments, the segments comprising a plurality of frames;
access first closed caption text for a first frame of a first segment of a first rendition;
access second closed caption text for a first frame of a first segment of a second rendition, wherein the first segment of the second rendition has a same segment position as the first segment of the first rendition, and wherein a position of the first frame of the first segment of the first rendition is a same position as the first frame of the first segment of the second rendition;

determine whether the first closed caption text matches the second closed caption text;

at least partly in response to determining that the first closed caption text fails to match the second closed caption text:

cause the first segment of the second rendition to be re-rendered; and cause the re-rendered first segment of the second rendition to be streamed over a network to a client device; and at least partly in response to determining that the first closed caption text fails to match the second closed caption text:

cause the first segment of the second rendition to be streamed over the network to the client device.

16. The non-transitory computer readable memory as defined in claim 15, wherein the first segment of the second rendition is partially transcoded.

17. The non-transitory computer readable memory as defined in claim 15, wherein the first frame is a randomly selected frame.

18. The non-transitory computer readable memory as defined in claim 15, wherein the plurality of renditions at respective different bit rates and/or resolutions are included in an ABR (Adaptive Bitrate) ladder.

19. The non-transitory computer readable memory as defined in claim 15, wherein the first closed caption text for the first frame of the first segment of the first rendition is accessed from a Supplemental Enhancement Information (SEI) message.

20. The non-transitory computer readable memory as defined in claim 15, wherein at least partly in response to determining that the first closed caption text fails to match the second closed caption text, the operations are configured to cause a misalignment indication to be generated.

21. The non-transitory computer readable memory as defined in claim 15, the operations further comprising transmitting a manifest file to the client device, the manifest file identifying available bitrate versions and their corresponding segments.

* * * * *